United States Patent
Ogino et al.

(10) Patent No.: US 8,153,262 B2
(45) Date of Patent: Apr. 10, 2012

(54) STRIPPABLE FLOOR COATING AND METHOD OF FORMING THE COATING

(75) Inventors: Fumitoshi Ogino, Suita (JP); Yoshio Okura, Saitama (JP)

(73) Assignees: Duskin Co., Ltd., Suita-Shi (JP); Konishi Co., Ltd., Osaka-Shi (JP)

( * ) Notice: Subject to any disclaimer, the term of this patent is extended or adjusted under 35 U.S.C. 154(b) by 992 days.

(21) Appl. No.: 11/989,576

(22) PCT Filed: Jul. 28, 2006

(86) PCT No.: PCT/JP2006/314963
§ 371 (c)(1),
(2), (4) Date: Jan. 28, 2008

(87) PCT Pub. No.: WO2007/013582
PCT Pub. Date: Feb. 1, 2007

(65) Prior Publication Data
US 2009/0130454 A1 May 21, 2009

(30) Foreign Application Priority Data
Jul. 29, 2005 (JP) ................................ 2005-219785

(51) Int. Cl.
*B32B 27/40* (2006.01)
*B05D 3/00* (2006.01)

(52) U.S. Cl. .................. 428/423.1; 428/424.8; 428/480; 428/484.1; 427/387

(58) Field of Classification Search ............... 428/424.8, 428/480, 484.1, 423.1; 427/385.5, 384, 387
See application file for complete search history.

(56) References Cited

U.S. PATENT DOCUMENTS

| | | | |
|---|---|---|---|
| 5,851,618 A | 12/1998 | Liddell et al. | |
| 6,555,177 B1* | 4/2003 | Magnusson et al. | 427/408 |
| 7,655,718 B2* | 2/2010 | Levitt et al. | 524/424 |
| 2002/0028621 A1* | 3/2002 | Levitt et al. | 442/131 |
| 2004/0054067 A1 | 3/2004 | Rogmann et al. | |

FOREIGN PATENT DOCUMENTS

| | | |
|---|---|---|
| JP | 11-199802 A | 7/1999 |
| JP | 2004-231823 A | 8/2004 |
| WO | WO-97/38412 A1 | 10/1997 |
| WO | WO-02/085991 A1 | 10/2002 |

* cited by examiner

*Primary Examiner* — Thao T. Tran
(74) *Attorney, Agent, or Firm* — Birch, Stewart, Kolasch & Birch, LLP (57) ABSTRACT

Disclosed is a strippable floor coating which includes an undercoat layer (A) to be applied to a floor surface, and a strippable overcoat layer (B) over the undercoat layer (A). The undercoat layer (A) is formed from an undercoating agent mainly containing a wax or analogue thereto and having film-formability. The overcoat layer (B) is formed from a floor polish composition mainly containing an aqueous emulsion. The undercoat layer (A) has greater adhesion to the floor surface than to the overcoat layer (B). Even when applied to various flooring materials, this strippable floor coating does not peel off practically and is excellent in soiling resistance and wear resistance to retain a beautiful appearance over long time. If necessary, the coating can be easily stripped off.

15 Claims, 1 Drawing Sheet

STRIPPABLE FLOOR COATING AND METHOD OF FORMING THE COATING

TECHNICAL FIELD

The present invention relates to strippable floor coatings using aqueous floor polishes, and methods of forming the coatings.

More specifically, it relates to strippable floor coatings that have such durability as to retain beautiful appearances of floors, can be stripped in sheets from the floors without using stripping agents, and use aqueous floor polishes. It also relates to methods of forming the coatings.

BACKGROUND ART

Aqueous floor polishes typified by aqueous polymer-containing floor polishes are applied to floors typically of department stores, mass retailers, supermarkets, and office buildings. Coating layers formed from these aqueous floor polishes serve to retain beautiful appearances and cleanliness of the floors and to prevent soiling and abrasion of flooring materials.

The coating layers after forming become soiled due typically to traffic and become scuffed due typically to sand and dust, and such soil and scuffs accumulate day by day. It has therefore been periodically carried out to clean the floors with cleaning agents for removing the soil from their surface layers, and to coat them with a new layer of a floor polish to thereby retain the floor surfaces clean. When it is difficult to maintain a floor surface clean due typically to significant soil and/or deep scuffing of the coating layer, the floor is cleaned using a polisher with a stripping agent to strip off the entire coating layer (hereinafter this operation is also referred to as "cleaning-by-stripping"), and a new layer of a floor polish is applied to the floor to refresh a coating layer.

This cleaning-by-stripping operation requires much efforts and time. The operation also has a problem in safety, because the floor surface after the application of a stripping agent is very slippery to cause failing accidents. Furthermore, the striping agent adversely affects the working environment and causes deterioration of construction materials. This is because the striping agent mainly contains an alkali, such as an amine, ammonia, or sodium hydroxide, and an organic solvent, such as an alcohol solvent or a glycol solvent. The alkali is used for cleaving crosslinking bonds in a resin coating constituting the coating layer, and the organic solvent is used for swelling the resin coating. Waste liquids wasted after cleaning-by-striping of such floor polishes are significant from the viewpoint of protecting the environment.

To solve these problems, there have been recently investigated aqueous floor polish compositions whose coating layers (overcoat layers) covering floors are strippable by hand (hereinafter also referred to as "strippable aqueous floor polish composition(s)").

Patent Document 1 discloses an example of the strippable aqueous floor polish compositions.

In floor coating materials, there has been known a strippable floor coating material which uses a latex as a release coating (undercoat layer) and an epoxy resin as a durable coating (overcoat layer), in which the release coating and the durable coating are peelable as a unit (Patent Document 2).
Patent Document 1: Japanese Unexamined Patent Application Publication (JP-A) No. 2004-231823
Patent Document 2: Japanese Unexamined Patent Application Publication (JP-A) No. H11-199802

DISCLOSURE OF INVENTION

Problems to be Solved by the Invention

When floor polishes are applied to floor surfaces to form coatings, the coatings should generally have such sufficient adhesiveness as to be resistant to peeling off due to traffic. In addition, they should be easily strippable if necessary for refreshing. It is very important that they should have these properties concurrently in good balance. In addition, these floor polishes should have general versatility to be applied to flooring materials of various kinds, because flooring materials to which the floor polishes are applied differ from user to user. One-component strippable aqueous floor polish compositions as disclosed in Patent Document 1 are poor in practical utility, because it is difficult to apply them to flooring materials of various kinds.

The strippable floor coating material disclosed in Patent Document 2 is such that the release coating layer and the durable coating layer are peelable in sheets when the floor surface itself is refreshed. It is desirable, however, to apply a new coating layer while the release layer remains on the surface of a flooring material. This saves efforts and time in operation of using such floor polishes, because new coating layers should be given relatively frequently in such floor polishes. Patent Document 2 never refers to this point and never makes considerations and investigations on required properties for aqueous floor polish compositions.

An object of the present invention is to provide a strippable floor coating using an aqueous floor polish as follows and a method of forming the coating. Specifically, even when applied to various flooring materials, this strippable floor coating does not peel off practically and excels in soiling resistance and wear resistance to retain a beautiful appearance of floor surface over a long time. If necessary, the coating can be easily stripped off. Such flooring materials to which the coating is applied include poly(vinyl chloride) flooring materials such as vinyl composition floor tiles, homogeneous vinyl floor tiles, and sheet vinyl floorings; linoleum flooring materials; rubber flooring materials; olefinic flooring materials; stone flooring materials; wood floorings; and poured floorings composed typically of epoxy resins or urethane resins. Another object of the present invention is to provide a strippable floor coating that can be refreshed simply by forming a new overcoat layer (B) through coating without applying another new undercoat layer (A), in which the undercoat layer (A) adheres satisfactorily to a floor surface and has greater adhesion to the floor surface than to the overcoat layer (B), and, if necessary, the overcoat layer (B) alone is stripped off at the interface with the undercoat layer (A).

Means for Solving the Problems

After intensive investigations to achieve these objects, the present inventors have found that a strippable floor coating applicable to various flooring materials can be obtained by arranging an undercoat layer (A) having a specific composition, applying an aqueous floor polish composition having a specific composition to the undercoat layer (A) to form an overcoat layer (B) thereon, and, if necessary, further arranging a finish coat layer (C) and a primer layer (D). The present invention has been made based on these findings. Specifically, the present invention is as follows.

1. A strippable floor coating which includes an undercoat layer (A) to be applied to a floor surface; and a strippable overcoat layer (B) over the undercoat layer (A). The undercoat layer (A) is formed from an undercoating agent mainly containing a wax or analogue thereto and having film-formability. The overcoat layer (B) is formed from a floor polish composition mainly containing an aqueous emulsion. The undercoat layer (A) has greater adhesion to the floor surface than to the overcoat layer (B).

2. The strippable floor coating according to 1, which further includes a finish coat layer (C) over the overcoat layer (B).

3. The strippable floor coating according to one of 1. and 2, wherein a primer layer (D) is preliminarily formed over the floor surface, and the undercoat layer (A) has greater adhesion to the primer layer (D) than to the overcoat layer (B).

4. The strippable floor coating according to any one of 1. to 3, in which the undercoat layer (A) is formed from an emulsified dispersion (a1) mainly containing at least one wax or analogue thereto selected from the group consisting of oxidized polyolefins, natural waxes, higher fatty acids, higher alcohols, and esters between higher fatty acids and higher alcohols.

5. The strippable floor coating according to any one of 1. to 3, in which the undercoat layer (A) is formed from a composition (a2) containing (i) a paraffin and/or a polyethylene each having an acid number of 0; and (ii) a resin emulsion.

6. The strippable floor coating according to 5, in which the resin emulsion (ii) is at least one selected from the group consisting of ethylene-vinyl acetate copolymer emulsions, acrylic emulsions, and urethane emulsions.

7. The strippable floor coating according to any one of 1. to 6, in which the aqueous emulsion which is main constituent of the floor polish composition for the formation of the overcoat layer (B) is a urethane emulsion.

8. The strippable floor coating according to any one of 1. to 7, wherein a finish coat layer (C) and/or a primer layer (D) is formed from an aqueous acrylic floor polish composition.

9. A method of forming a strippable floor coating, which includes the steps of:
applying an undercoating agent to a floor surface and drying the applied undercoating agent to form an undercoat layer (A), in which the undercoating agent mainly contains a wax or analogue thereto and has film-formability; and
applying a floor polish composition mainly containing an aqueous emulsion to the undercoat layer (A) and drying the applied floor polish composition to form a strippable overcoat layer (B), in which the undercoat layer (A) is so formed as to have greater adhesion to the floor surface than to the overcoat layer (B).

10. The method of forming a strippable floor coating, according to 9, which further includes the step of forming a finish coat layer (C) over the overcoat layer (B).

11. The method of forming a strippable floor coating, according to one of 9, and 10, wherein the primer layer (D) is preliminary formed over the floor surface, in which the undercoat layer (A) is so formed as to have greater adhesion to the primer layer (D) than to the overcoat layer (B).

12. The method of forming a strippable floor coating, according to any one of 9, to 11, in which an emulsified dispersion (a1) is used as the undercoating agent to form the undercoat layer (A), and the emulsified dispersion (a1) mainly contains at least one wax or analogue thereto selected from the group consisting of oxidized polyolefins, natural waxes, higher fatty acids, higher alcohols, and esters between higher fatty acids and higher alcohols.

13. The method of forming a strippable floor coating, according to any one of 9, to 11, in which a composition (a2) is used as the undercoating agent to form the undercoat layer (A), and the composition (a2) contains (i) a paraffin and/or a polyethylene each having an acid number of 0; and (ii) a resin emulsion.

14. The method of forming a strippable floor coating, according to above 13, in which the resin emulsion (ii) contains at least one selected from the group consisting of ethylene-vinyl acetate copolymer emulsions, acrylic emulsions, and urethane emulsions.

15. The method of forming a strippable floor coating, according to any one of 9, to 14, characterized in the aqueous emulsion which is main constituent of the floor polish composition to form the overcoat layer (B) is an urethane emulsion.

16. The method of forming a strippable floor coating, according to any one of 9, to 15, wherein a finish coat layer (C) and/or a primer layer (D) is from an aqueous acrylic floor polish composition.

Advantages

The following advantages are exhibited according to the present invention.

The strippable floor coating and the method of forming the coating according to the present invention are advantageous in that, even when applied to various flooring materials, the overcoat layer (B) does not peel off practically and excels in soiling resistance and wear resistance to retain a beautiful appearance of a floor surface over a long time, and that, if necessary, the overcoat layer (B) can be easily stripped off.

A strippable floor coating according to the present invention can be refreshed simply by forming a new overcoat layer (B) through coating without applying a new undercoat layer (A) again, because the undercoat layer (A) adheres satisfactorily to a floor surface and has greater adhesion to the floor surface than to the overcoat layer (B), and, if necessary, the overcoat layer (B) alone can be stripped off at the interface with the undercoat layer (A).

By further arranging a finish coat layer (C) as an outermost surface over the overcoat layer (B), the finish coat layer (C) protects the overcoat layer (B), and the floor coating excels in gloss, soiling resistance, and wear resistance to retain a beautiful appearance of the floor surface over a long time while the overcoat layer (B) remains being easily strippable. In other words, the function of easy stripping and the function of beautification are imparted to the respective coating layers in this case. The overcoat layer (B) and the finish coat layer (C) differ in that the overcoat layer (B) mainly plays a role of being easily strippable and the finish coat layer (C) mainly plays a role of exhibiting, for example, gloss and soiling resistance. In some embodiments, it is allowable to further arrange another overcoat layer (B) and another finish coat layer (C) in this order over the finish coat layer (C).

By arranging a primer layer (D) over a floor surface and applying an undercoat layer (A), the undercoat layer (A) can be always applied to the identical surface, thereby exhibit prominent effect that variation in strippability depending on the type of flooring material is further suppressed. For example, tiled floor has joints between the tiles, and it is difficult to apply an undercoating agent to the joints and to form a smooth surface. Therefore, it tends to form intricate place. An overcoating agent applied thereto becomes embedded in the intricate place, and the formed overcoat layer (B) may be resistant to stripping and be broken upon stripping. By arranging a primer layer (D) in such a case, the intricate place is smoothened, and the surface over which undercoating agent is applied become the smooth. Thus, the undercoat layer (A) is formed as a smooth layer, whereby the overcoat layer (B) can be easily stripped off therefrom. When the primer layer (D) is arranged, the undercoat layer (A) should have such a composition as to have greater adhesion to the primer layer (D) than to the overcoat layer (B). This avoids or eliminates adverse effects of the joints and various floor surfaces.

BEST MODE FOR CARRYING OUT THE INVENTION

Embodiments of the present invention will be illustrated below. It should be noted, however, that these are illustrated only by way of example and never construed to limit the scope of the present invention, and that various changes and modifications may be made without departing from the sprit and scope of the present invention.

All percentages (%) are by weight hereinafter.

Undercoating Agent for the Formation of Undercoat Layer (A)

An undercoating agent for use in the formation of the undercoat layer (A) may be an emulsified dispersion (a1) of a wax or analogue thereto, containing (1) a wax or analogue thereto, (2) an emulsifier, and (3) water; or a composition (a2) containing (1) a wax or an analogue thereto and (4) a resin emulsion.

The undercoating agent has a concentration of the wax or analogue thereto of preferably 0.1% to 10%, and more preferably 1% to 8%.

(1) Wax or Analogue Thereto

Of the undercoating agents for use in the present invention, the wax or analogue thereto for use in the emulsified dispersion (a1) is preferably at least one selected from the group consisting of oxidized polyolefins each having an acid number of 3 to 130 and a number-average molecular weight of 400 to 20000; natural waxes such as candelilla wax, carnauba wax, rice wax, vegetable wax (Japan wax), bees wax, and montan wax; higher fatty acids having ten to thirty-four carbon atoms, such as capric acid, lauric acid, myristic acid, palmityl acid, stearic acid, and behenic acid; higher alcohols having fourteen to thirty carbon atoms, such as tetradecyl alcohol, cetyl alcohol, octadecyl alcohol, and arachyl alcohol; esters between a higher fatty acid having ten to thirty-four carbon atoms and a higher alcohol having fourteen to thirty carbon atoms; and fatty acid amides.

Of the oxidized polyolefins, those having an acid number of 10 to 130 and a number-average molecular weight of 500 to 4000 are more preferred. Of the higher fatty acids, lauric acid, lauric acid, myristic acid, palmityl acid, stearic acid, and behenic acid are more preferred. Of the higher alcohols, cetyl alcohol, octadecyl alcohol, and arachyl alcohol are more preferred.

Of the undercoating agents for use in the present invention, the wax or analogue thereto for use in the composition (a2) is preferably selected typically from among paraffins, polyethylenes, and polypropylenes each having an acid number of 0 and a number-average molecular weight of 300 to 5000.

Among them, more preferred are paraffins and polyethylenes each having a number-average molecular weight of 400 to 1000.

(2) Emulsifier

Examples of usable emulsifiers include nonionic surfactants such as polyoxyethylene alkyl ethers, polyoxyethylene fatty acid esters, polyoxyethylene sorbitan fatty acid esters, sorbitan fatty acid esters, polyoxyethylene sorbitol fatty acid esters, and glycerol fatty acid esters; and anionic surfactants such as alkyl sulfates, salts of polyoxyethylene alkyl ether sulfates, alkylbenzene sulfonates, and salts of fatty acids. The undercoating agent may have an emulsifier concentration of 0.1% to 5%, and preferably 0.5% to 3%.

(4) Resin Emulsion

Examples of usable resin emulsions include ethylene-vinyl acetate copolymer emulsions, acrylic emulsions, urethane emulsions, styrene-butadiene copolymer emulsions, natural rubber emulsions, and silicone emulsions. Among them, ethylene-vinyl acetate copolymer emulsions, acrylic emulsions, and urethane emulsions are preferred, of which those having a minimum filming temperature (MFT) of 0° C. or lower and give flexible films are preferred.

The resin emulsion may have a resin concentration of preferably 10% to 70%, and more preferably 30% to 65%.

Aqueous Floor Polish Composition for the Formation of Overcoat Layer (B)

Examples of aqueous floor polish compositions for the formation of the overcoat layer (B) include known aqueous floor polish compositions containing urethane resins, acrylic urethane resins, and sililated urethane resins (i.e., urethane resins having a crosslinkable silicon-containing group), of which those mainly containing urethane resins are preferred.

These aqueous floor polish compositions mainly containing urethane resins each preferably contain (1) a urethane resin emulsion, (2) a leveling agent, (3) a filming aid, and (4) a crosslinking agent.

(1) Urethane Resin Emulsion

A urethane resin emulsion for use in the overcoating agent in the present invention can be one that is prepared by subjecting a diol component and a diisocyanate component to a urethane formation reaction to yield a urethane and introducing a hydrophilic group to cause self-emulsification of the urethane to thereby yield an emulsion; or one forcedly emulsifying the urethane with an emulsifier to yield an emulsion. The concentration of the urethane resin in the overcoating agent may be 10% to 35%, and is preferably 15% to 25%.

(2) Leveling Agent

Examples of the leveling agent for forming a smooth coating include glycols such as hexyl glycol, octyl glycol, 2-ethylhexyl glycol, decyl glycol, lauryl glycol, and dodecyl glycol; diglycols such as hexyl diglycol, octyl diglycol, 2-ethylhexyl diglycol, decyl diglycol, and dodecyl diglycol; N-alkyl-2-pyrrolidones such as N-octyl-2-pyrrolidone, N-decyl-2-pyrrolidone, and N-dodecyl-2-pyrrolidone; tributoxyethyl phosphate; rosin-modified alkyd resin salts; and styrene maleate. The concentration of the leveling agent in the overcoating agent may be 0.1% to 10%, and is preferably 0.5% to 5%.

(3) Filming Aid

Examples of usable filming aids include alcohols such as benzyl alcohol and 3-methoxy-3-methylbutanol; glycols such as diethylene glycol methyl ether, diethylene glycol dimethyl ether, diethylene glycol ethyl ether, diethylene glycol propyl ether, propylene glycol, dipropylene glycol methyl ether, butylene glycol, and hexylene glycol; and N-methyl-2-pyrrolidone. The concentration of the filming aid in the overcoating agent may be 2% to 15%, and is preferably 5% to 10%.

(4). Crosslinking Agent

Examples of usable crosslinking agents include polyvalent metal complex compounds such as zinc carbonate ammonia, calcium ethylenediamine carbonate ammonia, zinc glycine ammonia, zinc alanine ammonia, and zinc ethylenediamine acrylate; and carbodiimide-containing compounds such as products supplied from Nisshinbo Industries, Inc. under the trade names of "CARBODILITE". The concentration of the crosslinking agent in the overcoating agent may be 0.05 to 0.9 chemical equivalent to the acid number of the urethane resin.

Finish Coat Layer (C)

Any of known aqueous floor polish compositions can be used for the formation of the finish coat layer (C) in the present invention, of which those mainly containing acrylic resins are preferred.

Such aqueous floor polish compositions mainly containing acrylic resins preferably each contain (1) an acrylic resin emulsion, (2) a leveling agent, (3) a filming aid, (4) a crosslinking agent, and (5) a wax emulsion.

The finish coat layer (C) may further have any of functionalities such as antimicrobial properties, chemical resistance, alcohol resistance, antistatic properties, skid-proof properties, and insect-repellent properties it may further contain any other components such as coloring agents and pigments.

Primer Layer (D)

Any of known water-based or oil-based coating compositions, and aqueous floor polishes can be used in the primer layer (D) in the present invention.

Embodiments of the present invention will be illustrated in detail with reference to several examples below.

EXAMPLES

[Undercoat Layer (A)] (Undercoating Agents 1 to 11: Examples, Undercoating Agents 12 to 16: Comparative Examples)

Undercoating Agent 1: Oxidized Polyolefin (Supplied from Eastman Kodak Company Under the Trade Name of "Epolene E-10", Having an Acid Number of 15 and a Number-Average Molecular Weight of 1700)

In a 100-ml stainless steel beaker were placed "Epolene E-10" and a polyoxyethylene oleyl ether (oxyethylene units (EO): 14), the mixture was melted at 110° C. and combined with purified potassium hydroxide dissolved in a small amount of water. The molten mixture was gradually added to water at 95° C. to 98° C. with stirring. After the completion of addition, the mixture was cooled to room temperature and thereby yielded an emulsified dispersion. The amounts (parts by mass) of the components are as follows:

| | |
|---|---|
| Epolene E-10 | 50 |
| Polyoxyethylene oleyl ether | 15 |
| Purified potassium hydroxide | 1 |
| Water | 934 |
| Total | 1000 |

Undercoating Agent 2: Oxidized Polyolefin (Supplied from Baker Petrolite Corporation Under the Trade Name of "Ceramer 67", Having an Acid Number of 48 and a Number-Average Molecular Weight of 655)

In a 200-ml stainless steel beaker were placed "CERAMER 67", polyoxyethylene lauryl ether (EO: 8), and a hydrocarbon solvent (supplied from Exxon Mobile Corporation under the trade name of "Exxol D40"). The mixture was melted at 110° C. and combined with purified potassium hydroxide dissolved in a small amount of water The molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| CERAMER 67 | 50 |
| Polyoxyethylene lauryl ether | 10 |
| Exxol D40 | 40 |
| Purified potassium hydroxide | 1 |
| Water | 899 |
| Total | 1000 |

Undercoating Agent 3: Oxidized Polyolefin (Supplied from Honeywell International Inc. Under the Trade Name of "A-C580", Having an Acid Number of 75 and a Number-Average Molecular Weight of 700)

In a 200-ml stainless steel beaker were placed "A-C580", polyoxyethylene lauryl ether (EO: 10), and a hydrocarbon solvent (supplied from Exxon Mobile Corporation under the trade name of "Exxol D40"). The mixture was melted at 110° C. and combined with morpholine. The molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| A-C580 | 80 |
| Polyoxyethylene lauryl ether | 10 |
| Exxol D40 | 35 |
| Morpholine | 8 |
| Water | 867 |
| Total | 1000 |

Undercoating Agent 4: Oxidized Polyolefin (Supplied from Honeywell International Inc. Under the Trade Name of "A-C5120", Having an Acid Number of 120 and a Number-Average Molecular Weight of 700)

In a 200-ml stainless steel beaker were placed "A-C5120", polyoxyethylene lauryl ether (EO: 10), and a hydrocarbon solvent (supplied from Exxon Mobile Corporation under the trade name of "Exxol D40"). The mixture was melted at 110° C. and combined with morpholine. The molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| A-C5120 | 80 |
| Polyoxyethylene lauryl ether | 10 |
| Exxol D40 | 35 |
| Morpholine | 8 |
| Water | 867 |
| Total | 1000 |

Undercoating Agent 5: Carnauba Wax (Natural Wax)

In a 200-ml stainless steel beaker were placed carnauba wax, polyoxyethylene lauryl ether (EO: 8), and a hydrocarbon solvent (supplied from Idemitsu Kosan Co, Ltd. under the trade name of "Supasol LA25"). The mixture was melted at 110° C. and combined with monoethanolamine. The molten mixture was gradually added to water at 95° C. to 98° C. with stirring. After the completion of addition, the mixture was cooled to room temperature and thereby yielded an emulsified dispersion. The amounts (part by weight) of the respective components are as follows:

|   |   |
|---|---|
| Carnauba wax | 50 |
| Polyoxyethylene lauryl ether | 15 |
| Supasol LA25 | 40 |
| Monoethanolamine | 3 |
| Water | 892 |
| Total | 1000 |

Undercoating Agent 6: Stearic Acid (Higher Fatty Acid)

In a 100-ml stainless steel beaker were placed stearic acid and polyoxyethylene sorbitan stearate, the mixture was melted at 110° C. and combined with purified potassium hydroxide dissolved in a small amount of water. The molten mixture was gradually added to water at 95° C. to 98° C. with stirring. After the completion of addition, the mixture was cooled to room temperature and thereby yielded an emulsified dispersion. The amounts (part by weight) of the respective components are as follows:

|   |   |
|---|---|
| Stearic acid | 50 |
| Polyoxyethylene sorbitan stearate | 10 |
| Purified potassium hydroxide | 2 |
| Water | 938 |
| Total | 1000 |

Undercoating Agent 7: Octadecyl Alcohol (Higher Alcohol)

In a 200-ml stainless steel beaker were placed octadecyl alcohol, sorbitan stearate, polyoxyethylene sorbitan stearate, and "Supasol LA25", the mixture was melted at 110° C., and the molten mixture was gradually added to water at 95° C. to 98° C. with stirring. After the completion of addition, the mixture was cooled to room temperature and thereby yielded an emulsified dispersion. The amounts (part by weight) of the respective components are as follows:

|   |   |
|---|---|
| Octadecyl alcohol | 50 |
| Supasol LA25 | 40 |
| Sorbitan stearate | 5 |
| Polyoxyethylene sorbitan stearate | 10 |
| Water | 895 |
| Total | 1000 |

Undercoating Agent 8: Stearyl Stearate (Ester)

In a 200-ml stainless steel beaker were placed stearyl stearate, sorbitan stearate, polyoxyethylene sorbitan stearate, and "Supasol LA25", the mixture was melted at 110° C., and the molten mixture was gradually added to water at 95° C. to 98° C. with stirring. After the completion of addition, the mixture was cooled to room temperature and thereby yielded an emulsified dispersion. The amounts (part by weight) of the respective components are as follows:

|   |   |
|---|---|
| Stearyl stearate | 50 |
| Supasol LA25 | 40 |
| Sorbitan stearate | 5 |
| Polyoxyethylene sorbitan stearate | 10 |
| Water | 895 |
| Total | 1000 |

Undercoating Agent 9: Composition Containing a Solid Paraffin Having an Acid Number of 0 and an Ethylene-Vinyl Acetate Resin Emulsion (Solid Paraffin and Ethylene-Vinyl Acetate)

In a 200-ml stainless steel beaker were placed 120° F. paraffin, "Exxol D40", polyoxyethylene sorbitan stearate, and sorbitan stearate. The mixture was melted at 110° C., and the molten mixture was gradually added to water at 95° C. to 98° C. with stirring. After the completion of addition, the mixture was cooled to room temperature and thereby yielded a 120° F. paraffin emulsified dispersion. The amounts (part by weight) of the respective components are as follows:

|   |   |
|---|---|
| 120° F. Paraffin | 50 |
| Exxol D40 | 40 |
| Polyoxyethylene sorbitan stearate | 9 |
| Sorbitan stearate | 4 |
| Water | 897 |
| Total | 1000 |

The 120° F. paraffin emulsified dispersion was placed in a beaker, combined with an ethylene-vinyl acetate resin emulsion (supplied from Sumitomo Chemical Co, Ltd. under the trade name of "Sumikaflex 400", having a solid content of 65%), 2-ethylhexyl diglycol, and a wetting agent (supplied from AGC Seimi Chemical Co, Ltd. under the trade name of "Surflon S-111N", and thereby yielded a composition containing paraffin and an ethylene-vinyl acetate resin emulsion. The amounts (part by weight) of the respective components are as follows:

|   |   |
|---|---|
| 120° F. Paraffin emulsified dispersion | 900 |
| Ethylene-vinyl acetate resin emulsion | 40 |
| 2-Ethylhexyl diglycol | 2 |
| Wetting agent | 0.5 |
| Water | 57.5 |
| Total | 1000 |

Undercoating Agent 10: Composition Containing a Polyethylene Having an Acid Number of 0 and an Acrylic Resin Emulsion (Polyethylene and Acrylic Resin)

In a 200-ml stainless steel beaker were placed a polyethylene (supplied from Baker Petrolite Corporation under the trade name of "POLYWAX 500"), polyoxyethylene sorbitan stearate, sorbitan stearate, and "Exxol D40". The mixture was melted at 110° C., and the molten mixture was gradually added to water at 95° C. to 98° C. with stirring. After the completion of addition, the mixture was cooled to room temperature and thereby yielded a polyethylene emulsified dispersion. The amounts (part by weight) of the respective components are as follows:

| | |
|---|---|
| Polyethylene | 50 |
| Exxol D40 | 40 |
| Polyoxyethylene sorbitan stearate | 15 |
| Sorbitan stearate | 7 |
| Water | 888 |
| Total | 1000 |

The polyethylene emulsified dispersion was placed in a beaker, combined with the after-mentioned acrylic resin emulsion, 2-ethylhexyl diglycol, and a wetting agent (supplied from AGC Seimi Chemical Co, Ltd. under the trade name of "Surflon S-111N") and thereby yielded the target composition. The amounts (part by weight) of the respective components are as follows:

| | |
|---|---|
| Polyethylene emulsified dispersion | 900 |
| Acrylic resin emulsion | 40 |
| 2-Ethylhexyl diglycol | 2 |
| Wetting agent | 0.5 |
| Water | 57.5 |
| Total | 1000 |

Preparation of Acrylic Resin Emulsion

A flask equipped with a condenser and a stirrer was placed in a temperature-controllable water bath. In the flask were placed 380 parts by weight of water, 20 parts by weight of an anionic surfactant (sodium alkyl diphenyl ether disulfonate, active component content: 30%), and 20 parts by weight of a nonionic surfactant (polyoxyethylene nonyl phenyl ether, having a hydrophilic lipophilic balance (HLB) of 18.0) and thereby yielded a solution. The temperature in the flask was then raised to 75° C., and the following mixture and 11 parts by weight of 10% aqueous solution of ammonium persulfate were added dropwise over three hours for emulsion polymerization, and thereby yielded the target acrylic resin emulsion. The mixture contained 310 parts by weight of butyl acrylate, 260 parts by weight of methyl methacrylate, 10 parts by weight of acrylic acid, and 1 part by weight of γ-methacryloxypropylmethoxysilane. The resulting emulsion had a solid content of 59.8%, a pH of 3.8, and a viscosity of 1250 mPa·s.

Undercoating Agent 11: Composition Containing a Solid Paraffin Having an Acid Number of 0 and a Urethane Resin Emulsion (Solid Paraffin and Urethane Resin)

The 120° F. paraffin emulsified dispersion prepared in the undercoating agent 9 was placed in a beaker, combined with a urethane resin emulsion (supplied from ADEKA CORPORATION under the trade name of "ADEKA BONTIGHTER HUX-822" having a solid content of 40%), 2-ethylhexyl diglycol, and a wetting agent (supplied from AGC Seimi Chemical Co, Ltd. under the trade name of "Surflon S-111N"), and thereby yielded the target composition. The amounts (part by weight) of the respective components are as follows:

| | |
|---|---|
| 120° F. paraffin emulsified dispersion in Undercoating Agent 8 | 900 |
| Urethane resin emulsion | 70 |
| 2-Ethylhexyl diglycol | 2 |
| Wetting agent | 0.5 |
| Water | 27.5 |
| Total | 1000 |

Undercoating Agent 12: Liquid Paraffin

In a 1000-ml stainless steel beaker were placed liquid paraffin, polyoxyethylene sorbitan stearate, sorbitan stearate, and "Exxol D40". The mixture was melted at 110° C., and the molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| Liquid paraffin | 50 |
| Exxol D40 | 40 |
| Polyoxyethylene sorbitan stearate | 9 |
| Sorbitan stearate | 4 |
| Water | 897 |
| Total | 1000 |

Undercoating Agent 13: 120° F. Paraffin (Solid Paraffin)

The 120° F. paraffin emulsified dispersion prepared in the undercoating agent 9 was used.

Undercoating Agent 14: Polyethylene (Supplied from Baker Petrolite Corporation Under the Trade Name of "Polywax 500", Having an Acid Number of 0 and a Number-Average Molecular Weight of 500)

The polyethylene emulsified dispersion prepared in the undercoating agent 10 was used.

Undercoating Agent 15: Polypropylene (Supplied from Sanyo Chemical Industries, Ltd. Under the Trade Name of "Viscol 660-P", Having an Acid Number of 0 and a Number-Average Molecular Weight of 3000)

In a 200-ml stainless steel beaker were placed polypropylene, oleic acid, and "Exxol D40". The mixture was melted at 110° C., combined with monoethanolamine, and the molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| Polypropylene | 50 |
| Exxol D40 | 40 |
| Oleic acid | 15 |
| Monoethanolamine | 5 |
| Water | 888 |
| Total | 1000 |

Undercoating Agent 16: Oxidized Polyolefin (Supplied from Honeywell International Inc. Under the Trade Name of "A-C5180", Having an Acid Number of 180 and a Number-Average Molecular Weight of 700)

In a 200-ml stainless steel beaker were placed "A-C5180", polyoxyethylene lauryl ether (EO: 10), and a hydrocarbon solvent (supplied from Exxon Mobile Corporation under the trade name of "Exxol D40"). The mixture was melted at 110° C. and combined with morpholine, and the molten mixture was gradually added to water at 95° C. to 98° C. with stirring. After the completion of addition, the mixture was cooled to room temperature and thereby yielded an emulsified dispersion. The amounts (part by weight) of the respective components are as follows:

| | |
|---|---|
| A-C5180 | 80 |
| Polyoxyethylene lauryl ether | 10 |
| Exxol D40 | 35 |
| Morpholine | 8 |
| Water | 867 |
| Total | 1000 |

[Overcoat Layer (B)] (Overcoating Agents 1 to 3)

Overcoating Agent 1: Composition of Polyurethane Resin Emulsion

| | |
|---|---|
| Urethane resin emulsion[1] | 600 |
| 2-Ethylhexyl diglycol | 10 |
| Diethylene glycol monomethyl ether | 70 |
| 5% Zinc solution[2] | 20 |
| Wetting agent[3] | 0.3 |
| Preservative[4] | 0.5 |
| Antifoaming agent[5] | 0.2 |
| Water | 299 |
| Total | 1000 |

[1] Product supplied from Yusa Technica Japan Co., Ltd. under the trade name of "Michepolymer M" having a solid content of 35%
[2] Solution of zinc oxide in ammonium carbonate and aqueous ammonia
[3] Product supplied from AGC Seimi Chemical Co., Ltd. under the trade name of "Surflon S-111N"
[4] Product supplied from TAISHO TECHNOS CO., LTD. under the trade name of "BIO-SAIDO 2100A"
[5] Product supplied from Dow Corning Corporation under the trade name of "FS ANTI-FOAM 90"

Overcoating Agent 2: Composition of Acrylic Urethane Emulsion

| | |
|---|---|
| Acrylic Resin Emulsion[6] | 300 |
| Urethane Resin Emulsion[1] | 300 |
| 2-Ethylhexyl diglycol | 20 |
| Diethylene glycol ethyl ether | 80 |
| Wax emulsion[7] | 60 |
| Wetting agent[3] | 0.3 |
| Preservative[4] | 0.5 |
| Antifoaming agent[5] | 0.2 |
| Water | 239 |
| Total | 1000 |

[6] Product supplied from Rohm and Haas Company under the trade name of "PRIMAL B-924", having a solid content of 38%
[7] Product supplied from Toho Chemical Industry Co., Ltd. under the trade name of "High-Tech E-4BS", having a solid content of 40%

Overcoating Agent 3: Composition of Polyurethane Emulsion

| | |
|---|---|
| Urethane resin emulsion[8] | 550 |
| TBEP[9] | 10 |
| Diethylene glycol monomethyl ether | 30 |
| Wax emulsion[7] | 50 |
| 5% Zinc solution | 10 |
| Wetting agent[3] | 0.3 |
| Preservative[4] | 0.5 |
| Antifoaming agent[5] | 0.2 |
| Water | 299 |
| Total | 1000 |

[8] Product supplied from ADEKA CORPORATION under the trade name of "ADEKA BONTIGHTER HUX-822", having a solid content of 40%
[9] Tributoxyethyl phosphate

[Finish Coat Layer (C)] (Finishing Agents 1 and 2)

Finishing Agent 1: Composition of Acrylic Resin Emulsion

| | |
|---|---|
| Styrene-acrylic resin emulsion[10] | 450 |
| TBEP | 30 |
| Diethylene glycol monomethyl ether | 85 |
| Wax emulsion[7] | 90 |
| Styrene-maleic acid resin solution with a solid content of 15% | 10 |
| Wetting agent[3] | 0.3 |
| Preservative[4] | 0.5 |
| Antifoaming agent[5] | 0.2 |
| Water | 299 |
| Total | 1000 |

[10] Product supplied from Rohm and Haas Corporation under the trade name of "Primal HPDR", having a solid content of 38%

Finishing Agent 2: Product Under the Trade Name of "Crystal Hibiki" (Supplied from Konishi Co, Ltd, Aqueous Acrylic Polymer, Having a Non-Volatile Content of 23%)

[Primer (D)] (Primers A and B)

Primer A: Product Under the Trade Name of "Vantage Y-2" (Supplied from Konishi Co, Ltd, Aqueous Acrylic Polymer Primer Having a Non-Volatile Content of 25%)

Primer B: Product Under the Trade Name of "Isolacquer with Gloss" (Supplied from ABC Trading Co, Ltd, Two-Component Polyurethane Coating Composition Diluted with a Lacquer Thinner to a Non-Volatile Content of 20%)

[Examples 1 to 44], [and Comparative Examples 1 to 18]

Test flooring materials used were a vinyl composition floor tile (supplied from Tajima, Inc. under the trade name of "P TILE P-1") according to the standard specified in Japanese Industrial Standards (JIS) A5705, a sheet vinyl flooring (supplied from LONSEAL Corporation under the trade name of "LONLEUM No. 159") according to the standard specified in JIS A5707, and a composite flooring type 1 (supplied from TOYOTEX Inc. under the trade name of "Seven-Brown 712") according to the standard specified in the Japanese Agricultural Standards (JAS).

The combinations of (primer)/(undercoating agent)/(overcoating agent)/(finishing agent) in Tables 1 to 6 were applied to surfaces of these flooring materials.

A primer was applied according to the procedure in tests for floor-polishes. Specifically, the primer was applied to the surface of a test flooring material with a gauze to an amount of coating of 10±2 ml/m$^2$, dried for one hour, and thereby yielded a primer layer. An undercoating agent was applied to the floor surface and the primer layer with a gauze to an amount of coating of 10±2 ml/m$^2$, dried for one hour, and thereby yielded an undercoat layer. An overcoating agent was applied with a gauze to an amount of coating of 15±2 ml/m$^2$ and dried for one hour. After drying, another layer of the overcoating agent was applied with a gauze to an amount of coating of 15±2 ml/m$^2$ and dried for one hour. This operation was repeated a total of six times, and the applied layers were dried for twenty-four hours. A finishing agent was then applied with a gauze to an amount of coating of 10±2 ml/m$^2$, dried for one hour, and thereby yielded a finish coat layer. In this manner, a series of test pieces each bearing a strippable floor coating was prepared. These test pieces were subjected to the following tests to give results shown in Tables 1 to 6.

<Evaluated Properties and Evaluation Methods>
Adhesion

Flooring materials were worn by rubber shoe heels under traffic. Whether a test piece has sufficient adhesion to endure traffic was determined with a heel mark tester specified in "16. Heel Mark Resistance" of JIS K3920. Specifically, the test piece was mounted securely to a predetermined position of the heel mark tester. Six blocks of standard rubber were placed in a test drum, and the drum was rotated at a number of revolutions of 50 per minute for five minutes, and the drum was then rotated in a reversed direction for five minutes. Thus, the drum was rotated for a total of ten minutes. The test piece was retrieved from the heel mark tester, gently rubbed with a napped cotton cloth (flannel) on surface to remove dirt and dust from the surface, and whether the coating showed breakage and/or lifting was determined.

The heel mark tester includes a hexagonal columnar test drum having six sides each configured to hold a test piece, and a revolving shaft fixed to the test drum. The revolving shaft is rotatable at a number of revolutions of 50 per minute by the action of an electric motor. The standard rubber blocks are each composed of a black rubber containing carbon black and being compliant to the materials of rubber heels as specified in 6.2 (Materials for Outsole and Heel) of JIS S5050. These blocks are cubic 50 mm long, 50 mm wide, and 50 mm high and each have a mass of 170 to 180 grams.

Criteria: Coating shows neither breakage nor lifting: A
 Coating shows no breakage but slight lifting: B
 Coating shows no breakage but lifting: C
 Coating shows breakage: D Heel Mark Resistance Flooring materials are scuffed under traffic, to which black heel rubber is attached. The resistance to the attachment of black rubber is referred to as heel mark resistance. The evaluation was conducted according to the procedure in the floor-polishing test method as specified in JIS K3920. Specifically, how the black rubber was attached to the test piece used in the adhesion test was visually observed.

Figure 1:
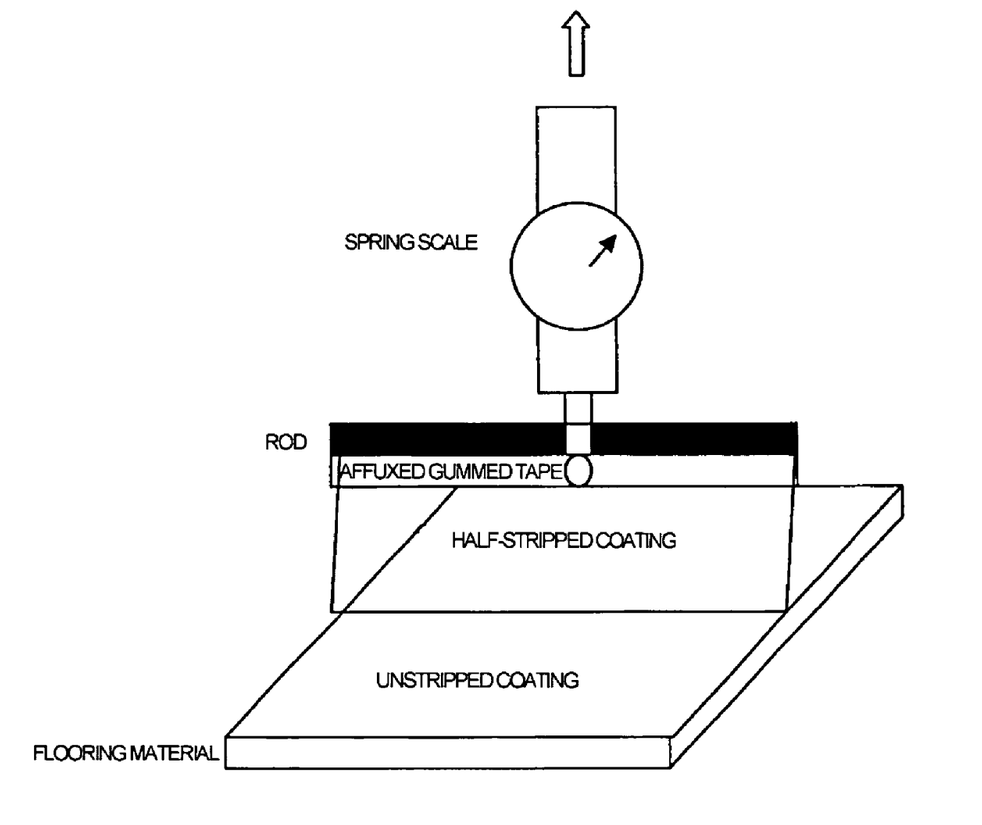
FIG. 1 is a diagram schematically illustrating a stripping test.

Criteria: No black rubber is attached: A
 Black rubber is slightly attached: B
 Black rubber is attached: C
 Black rubber is significantly attached: D Strippability A floor-polishing coating (overcoat layer (B)) of a test piece was stripped off in sheets, and the strippability (easiness to strip) was determined according to the following method as illustrated in FIG. 1. Specifically, the coating was gradually stripped from the test piece (flooring material) at its corner with a knife and hand to a half of the test piece. One half of a commercially available gummed tape was attached to the exposed face of the stripped coating facing the flooring material, the gummed tape was wound around a rod having a length the same as with the width of the flooring material, and the other half of the gummed tape was affixed to the surface of the coating. A hole was formed beneath the midpoint of the rod, whereby the rod was hooked with a hook of a spring scale, and the spring scale was pulled in a direction perpendicular to the flooring material at a rate of about 10 mm/second, and a maximum force at which the coating was completely stripped off was measured. The tested coating had a width of 225 mm.

Criteria: 0 to 10 N/225-mm: A
 10 to 20 N/225-mm: B
 20 to 30 N/225-mm: C
 30 N/225-mm or more: D

TABLE 1

TABLE 1-1 Flooring material: Vinyl composition floor tile

| Example number | Primer | Undercoating agent | Overcoating agent | Finishing agent | Adhesion | Heel mark resistance | Strippability |
|---|---|---|---|---|---|---|---|
| 1 | None | 1. Oxidized olefin | 1. Polyurethane | None | B | B | A |
| 2 | None | 2. Oxidized olefin | | None | B | B | A |
| 3 | None | 3. Oxidized olefin | | Finishing agent 1 | A | A | A |
| 4 | None | 3. Oxidized olefin | | None | A | B | B |
| 5 | Primer A[11] | 3. Oxidized olefin | | None | A | B | A |
| 6 | None | 4. Oxidized olefin | | None | A | B | B |
| 7 | None | 5. Natural wax | | None | B | B | A |
| 8 | None | 6. Higher fatty acid | | None | A | B | B |
| 9 | None | 7. Higher alcohol | | None | A | B | B |
| 10 | None | 8. Ester | | None | B | B | A |
| 11 | None | 9. Solid paraffin and ethylene-vinyl acetate | | Finishing agent 1 | A | A | B |
| 12 | Primer A | 9. Solid paraffin and ethylene-vinyl acetate | | None | A | B | A |
| 13 | None | 10. Polyethylene and acrylic resin | | None | A | B | B |
| 14 | None | 11. Solid paraffin and urethane resin | | None | A | B | B |
| 15 | None | 1. Oxidized olefin | 2. Acrylic urethane | None | B | A | A |
| 16 | Primer A | 2. Oxidized olefin | | None | B | A | A |
| 17 | None | 2. Oxidized olefin | | None | B | A | B |
| 18 | None | 3. Oxidized olefin | | None | A | A | B |
| 19 | Primer A | 4. Oxidized olefin | | Finishing agent 1 | B | A | A |
| 20 | None | 4. Oxidized olefin | | None | A | A | B |
| 21 | None | 5. Natural wax | | Finishing agent 2[12] | A | A | A |
| 22 | None | 5. Natural wax | | None | B | A | A |
| 23 | None | 6. Higher fatty acid | | None | A | A | B |

TABLE 1-continued

TABLE 1-1 Flooring material: Vinyl composition floor tile

| Example number | Primer | Undercoating agent | Overcoating agent | Finishing agent | Adhesion | Heel mark resistance | Strippability |
|---|---|---|---|---|---|---|---|
| 24 | None | 7. Higher alcohol | | None | A | A | B |
| 25 | None | 8. Ester | | None | B | A | A |
| 26 | None | 9. Solid paraffin and ethylene-vinyl acetate | | None | A | A | B |
| 27 | Primer A | 10. Polyethylene and acrylic resin | | None | A | A | A |
| 28 | None | 10. Polyethylene and acrylic resin | | None | A | A | B |
| 29 | None | 11. Solid paraffin and urethane resin | | None | A | A | B |

[11] Product of Konishi Co., Ltd. under the trade name of "Vantage Y-2"
[12] Product of Konishi Co., Ltd. under the trade name of "CRYSTAL HIBIKI"

TABLE 2

TABLE 1-2 Flooring material: Vinyl composition floor tile (continued)

| Example number | Primer | Undercoating agent | Overcoating agent | Finishing agent | Adhesion | Heel mark resistance | Strippability |
|---|---|---|---|---|---|---|---|
| 30 | None | 1. Oxidized olefin | 3. Polyurethane | None | B | A | A |
| 31 | None | 2. Oxidized olefin | | None | B | A | A |
| 32 | None | 3. Oxidized olefin | | None | A | A | B |
| 33 | None | 4. Oxidized olefin | | None | A | A | B |
| 34 | None | 5. Natural wax | | None | B | A | A |
| 35 | Primer A | 6. Higher fatty acid | | None | A | A | A |
| 36 | None | 6. Higher fatty acid | | None | A | A | B |
| 37 | None | 7. Higher alcohol | | None | A | A | B |
| 38 | None | 8. Ester | | None | B | A | A |
| 39 | None | 8. Ester | | Finishing agent 2 | B | A | A |
| 40 | None | 9. Solid paraffin and ethylene-vinyl acetate | | None | A | A | B |
| 41 | None | 10. Polyethylene and acrylic resin | | None | A | A | B |
| 42 | Primer A | 11. Solid paraffin and urethane resin | | Finishing agent 1 | A | A | A |
| 43 | None | 11. Solid paraffin and urethane resin | | Finishing agent 1 | A | A | B |
| 44 | None | 11. Solid paraffin and urethane resin | | None | A | A | B |

TABLE 3

TABLE 2-1 Flooring material: Sheet vinyl flooring

| Example number | Primer | Undercoating agent | Overcoating agent | Finishing agent | Adhesion | Heel mark resistance | Strippability |
|---|---|---|---|---|---|---|---|
| 1 | None | 1. Oxidized olefin | 1. Polyurethane | Finishing agent 1 | B | A | A |
| 2 | None | 1. Oxidized olefin | | None | B | B | A |
| 3 | None | 2. Oxidized olefin | | None | B | B | A |
| 4 | None | 3. Oxidized olefin | | None | B | B | A |
| 5 | None | 4. Oxidized olefin | | None | B | B | A |
| 6 | None | 5. Natural wax | | None | B | B | A |
| 7 | None | 6. Higher fatty acid | | None | B | B | A |
| 8 | Primer A | 7. Higher alcohol | | None | B | B | A |
| 9 | None | 7. Higher alcohol | | None | B | B | A |
| 10 | None | 8. Ester | | None | B | B | A |

TABLE 3-continued

TABLE 2-1 Flooring material: Sheet vinyl flooring

| Example number | Primer | Undercoating agent | Overcoating agent | Finishing agent | Evaluation Adhesion | Heel mark resistance | Strippability |
|---|---|---|---|---|---|---|---|
| 11 | Primer A | 9. Solid paraffin and ethylene-vinyl acetate | | Finishing agent 1 | B | A | A |
| 12 | None | 9. Solid paraffin and ethylene-vinyl acetate | | Finishing agent 2 | B | A | A |
| 13 | None | 9. Solid paraffin and ethylene-vinyl acetate | | None | B | B | A |
| 14 | None | 10. Polyethylene and acrylic resin | | None | B | B | A |
| 15 | None | 11. Solid paraffin and urethane resin | | None | B | B | A |

TABLE 4

TABLE 2-2 Flooring material: Sheet vinyl flooring (continued)

| Example number | Primer | Undercoating agent | Overcoating agent | Finishing agent | Evaluation Adhesion | Heel mark resistance | Strippability |
|---|---|---|---|---|---|---|---|
| 16 | None | 1. Oxidized olefin | 2. Acrylic urethane | None | B | A | A |
| 17 | None | 2. Oxidized olefin | | None | B | A | A |
| 18 | None | 2. Oxidized olefin | | Finishing agent 1 | B | A | A |
| 19 | Primer A | 3. Oxidized olefin | | None | B | A | A |
| 20 | None | 3. Oxidized olefin | | None | B | A | A |
| 21 | None | 4. Oxidized olefin | | None | B | A | A |
| 22 | None | 5. Natural wax | | None | B | A | A |
| 23 | None | 6. Higher fatty acid | | None | B | A | A |
| 24 | None | 7. Higher alcohol | | None | B | A | A |
| 25 | None | 8. Ester | | None | B | A | A |
| 26 | None | 9. Solid paraffin and ethylene-vinyl acetate | | None | B | A | A |
| 27 | Primer A | 10. Polyethylene and acrylic resin | | Finishing agent 2 | B | A | A |
| 28 | None | 10. Polyethylene and acrylic resin | | None | B | A | A |
| 29 | None | 11. Solid paraffin and urethane resin | | None | B | A | A |
| 30 | None | 1. Oxidized olefin | 3. Polyurethane | None | B | A | A |
| 31 | Primer A | 2. Oxidized olefin | | None | B | A | A |
| 32 | None | 2. Oxidized olefin | | None | B | A | A |
| 33 | None | 3. Oxidized olefin | | None | B | A | A |
| 34 | None | 4. Oxidized olefin | | Finishing agent 1 | B | A | A |
| 35 | None | 4. Oxidized olefin | | None | B | A | A |
| 36 | None | 5. Natural wax | | Finishing agent 2 | B | A | A |
| 37 | None | 5. Natural wax | | None | B | A | A |
| 38 | None | 6. Higher fatty acid | | None | B | A | A |
| 39 | None | 7. Higher alcohol | | None | B | A | A |
| 40 | None | 8. Ester | | None | B | A | A |
| 41 | None | 9. Solid paraffin and ethylene-vinyl acetate | | None | B | A | A |
| 42 | None | 10. Polyethylene and acrylic resin | | None | B | A | A |
| 43 | Primer A | 10. Polyethylene and acrylic resin | | Finishing agent 1 | B | A | A |
| 44 | None | 11. Solid paraffin and urethane resin | | Finishing agent 2 | B | A | A |

TABLE 5

TABLE 3-1 Flooring material: Composite flooring type 1

| Example number | Primer | Undercoating agent | Overcoating agent | Finishing agent | Adhesion | Heel mark resistance | Strippability |
|---|---|---|---|---|---|---|---|
| 1 | None | 1. Oxidized olefin | 1. Polyurethane | None | B | B | A |
| 2 | None | 2. Oxidized olefin | | None | B | B | A |
| 3 | None | 3. Oxidized olefin | | Finishing agent 1 | A | A | A |
| 4 | None | 3. Oxidized olefin | | None | A | B | A |
| 5 | Primer B[12] | 4. Oxidized olefin | | None | A | B | A |
| 6 | None | 4. Oxidized olefin | | None | A | B | B |
| 7 | None | 5. Natural wax | | None | B | B | A |
| 8 | None | 6. Higher fatty acid | | None | A | B | B |
| 9 | None | 7. Higher alcohol | | None | A | B | B |
| 10 | None | 8. Ester | | None | B | B | A |
| 11 | None | 9. Solid paraffin and ethylene-vinyl acetate | | Finishing agent 2 | A | A | B |
| 12 | Primer B | 9. Solid paraffin and ethylene-vinyl acetate | | None | A | B | A |
| 13 | None | 10. Polyethylene and acrylic resin | | None | A | B | B |
| 14 | None | 11. Solid paraffin and urethane resin | | None | A | B | B |
| 15 | None | 1. Oxidized olefin | 2. Acrylic urethane | None | B | A | A |
| 16 | Primer B | 2. Oxidized olefin | | None | B | A | A |
| 17 | None | 2. Oxidized olefin | | None | B | A | B |
| 18 | None | 3. Oxidized olefin | | None | B | A | A |
| 19 | Primer B | 4. Oxidized olefin | | Finishing agent 1 | B | A | A |
| 20 | None | 4. Oxidized olefin | | None | A | A | B |
| 21 | None | 5. Natural wax | | Finishing agent 2 | B | A | A |
| 22 | None | 5. Natural wax | | None | B | A | A |
| 23 | None | 6. Higher fatty acid | | None | A | A | B |
| 24 | None | 7. Higher alcohol | | None | A | A | B |
| 25 | None | 8. Ester | | None | B | A | A |
| 26 | None | 9. Solid paraffin and ethylene-vinyl acetate | | None | A | A | B |
| 27 | Primer B | 10. Polyethylene and acrylic resin | | None | A | A | A |
| 28 | None | 10. Polyethylene and acrylic resin | | None | A | A | B |
| 29 | None | 11. Solid paraffin and urethane resin | | None | A | A | B |

[12] Product of ABC TRADING CO., LTD. under the trade name of "Isolacquer With Gloss"

TABLE 6

TABLE 3-2 Flooring material: Composite flooring type 1 (continued)

| Example number | Primer | Undercoating agent | Overcoating agent | Finishing agent | Adhesion | Heel mark resistance | Strippability |
|---|---|---|---|---|---|---|---|
| 30 | None | 1. Oxidized olefin | 3. Polyurethane | None | B | A | A |
| 31 | None | 2. Oxidized olefin | | None | B | A | A |
| 32 | None | 3. Oxidized olefin | | None | B | A | B |
| 33 | None | 4. Oxidized olefin | | None | A | A | B |
| 34 | None | 5. Natural wax | | None | B | A | A |
| 35 | Primer A | 6. Higher fatty acid | | None | A | A | A |
| 36 | None | 6. Higher fatty acid | | None | A | A | B |
| 37 | None | 7. Higher alcohol | | None | A | A | B |
| 38 | None | 8. Ester | | None | B | A | A |
| 39 | None | 8. Ester | | Finishing agent 2 | B | A | A |
| 40 | None | 9. Solid paraffin and ethylene-vinyl acetate | | None | A | A | B |
| 41 | None | 10. Polyethylene and acrylic resin | | None | A | A | B |
| 42 | Primer A | 11. Solid paraffin and urethane resin | | Finishing agent 1 | A | A | A |

TABLE 6-continued

TABLE 3-2 Flooring material: Composite flooring type 1 (continued)

| Example number | Primer | Undercoating agent | Overcoating agent | Finishing agent | Adhesion | Heel mark resistance | Strippability |
|---|---|---|---|---|---|---|---|
| 43 | None | 11. Solid paraffin and urethane resin | | Finishing agent 1 | A | A | B |
| 44 | None | 11. Solid paraffin and urethane resin | | None | A | A | B |

TABLE 7

TABLE 4 Flooring material: Vinyl composition floor tile

| Comparative Example number | Primer | Undercoating agent | Overcoating agent | Finishing agent | Adhesion | Heel mark resistance | Strippability |
|---|---|---|---|---|---|---|---|
| 1 | None | 12. Liquid paraffin | 1. Polyurethane | None | B | B | D |
| 2 | Primer A | 13. Solid paraffin | | Finishing agent 1 | D | ND | A |
| 3 | Primer A | 13. Solid paraffin | | None | D | ND | A |
| 4 | None | 13. Solid paraffin | | Finishing agent 1 | D | ND | A |
| 5 | None | 13. Solid paraffin | | None | D | ND | A |
| 6 | None | 14. Polyethylene | | None | D | ND | A |
| 7 | None | 15. Polypropylene | | None | D | ND | A |
| 8 | None | 16. Oxidized olefin | | None | A | B | D |
| 9 | None | 12. Liquid paraffin | 2. Acrylic urethane | None | B | A | D |
| 10 | None | 13. Solid paraffin | | None | D | ND | A |
| 11 | Primer A | 14. Polyethylene | | Finishing agent 1 | D | ND | A |
| 12 | Primer A | 14. Polyethylene | | None | D | ND | A |
| 13 | None | 14. Polyethylene | | Finishing agent 2 | D | ND | A |
| 14 | None | 14. Polyethylene | | None | D | ND | A |
| 15 | None | 15. Polypropylene | | None | D | ND | A |
| 16 | None | 16. Oxidized olefin | | None | A | A | D |
| 17 | None | 12. Liquid paraffin | 3. Polyurethane | None | B | A | D |
| 18 | None | 13. Solid paraffin | | None | D | ND | A |
| 19 | None | 14. Polyethylene | | None | D | ND | A |
| 20 | Primer A | 15. Polypropylene | | Finishing agent 2 | D | ND | A |
| 21 | Primer A | 15. Polypropylene | | None | D | ND | A |
| 22 | None | 15. Polypropylene | | Finishing agent 1 | D | ND | A |
| 23 | None | 15. Polypropylene | | None | D | ND | A |
| 24 | None | 16. Oxidized olefin | | None | A | A | D |

ND: The coating was broken and could not be evaluated.

TABLE 8

TABLE 5 Flooring material: Sheet vinyl flooring

| Comparative Example number | Primer | Undercoating agent | Overcoating agent | Finishing agent | Adhesion | Heel mark resistance | Strippability |
|---|---|---|---|---|---|---|---|
| 1 | Primer A | 12. Liquid paraffin | 1. Polyurethane | Finishing agent 1 | B | A | D |
| 2 | Primer A | 12. Liquid paraffin | | None | B | B | D |
| 3 | None | 12. Liquid paraffin | | Finishing agent 1 | B | A | D |
| 4 | None | 12. Liquid paraffin | | None | B | B | D |
| 5 | None | 13. Solid paraffin | | None | D | ND | A |
| 6 | None | 14. Polyethylene | | None | D | ND | A |
| 7 | None | 15. Polypropylene | | None | D | ND | A |
| 8 | None | 16. Oxidized olefin | | None | A | B | D |

TABLE 8-continued

TABLE 5 Flooring material: Sheet vinyl flooring

| Comparative Example number | Primer | Undercoating agent | Overcoating agent | Finishing agent | Adhesion | Heel mark resistance | Strippability |
|---|---|---|---|---|---|---|---|
| 9 | None | 12. Liquid paraffin | 2. Acrylic urethane | None | B | A | D |
| 10 | None | 13. Solid paraffin | | None | D | ND | A |
| 11 | Primer A | 13. Solid paraffin | | Finishing agent 2 | D | ND | A |
| 12 | None | 14. Polyethylene | | Finishing agent 1 | D | ND | A |
| 13 | None | 14. Polyethylene | | None | D | ND | A |
| 14 | None | 15. Polypropylene | | None | D | ND | A |
| 15 | Primer A | 15. Polypropylene | | None | D | ND | A |
| 16 | None | 16. Oxidized olefin | | None | A | A | D |
| 17 | None | 12. Liquid paraffin | 3. Polyurethane | None | B | A | D |
| 18 | None | 13. Solid paraffin | | None | D | ND | A |
| 19 | None | 14. Polyethylene | | None | D | ND | A |
| 20 | None | 15. Polypropylene | | None | D | ND | A |
| 21 | Primer A | 16. Oxidized olefin | | Finishing agent | A | A | D |
| 22 | None | 16. Oxidized olefin | | Finishing agent 1 | A | A | D |
| 23 | Primer A | 16. Oxidized olefin | | None | A | A | D |
| 24 | None | 16. Oxidized olefin | | None | A | A | D |

TABLE 9

TABLE 6 Flooring material: Sheet vinyl flooring

| Comparative Example number | Primer | Undercoating agent | Overcoating agent | Finishing agent | Adhesion | Heel mark resistance | Strippability |
|---|---|---|---|---|---|---|---|
| 1 | None | 12. Liquid paraffin | 1. Polyurethane | None | B | B | D |
| 2 | Primer B | 13. Solid paraffin | | Finishing agent 1 | D | ND | A |
| 3 | None | 13. Solid paraffin | | None | D | ND | A |
| 4 | Primer B | 14. Polyethylene | | None | D | ND | A |
| 5 | None | 14. Polyethylene | | None | D | ND | A |
| 6 | None | 15. Polypropylene | | Finishing agent 2 | D | ND | A |
| 7 | None | 15. Polypropylene | | None | D | ND | A |
| 8 | None | 16. Oxidized olefin | | None | A | B | D |
| 9 | None | 12. Liquid paraffin | 2. Acrylic urethane | None | A | B | D |
| 10 | None | 13. Solid paraffin | | None | D | ND | A |
| 11 | Primer B | 13. Solid paraffin | | Finishing agent 1 | D | ND | A |
| 12 | None | 14. Polyethylene | | Finishing agent | D | ND | A |
| 13 | None | 14. Polyethylene | | None | D | ND | A |
| 14 | None | 15. Polypropylene | | None | D | ND | A |
| 15 | Primer B | 15. Polypropylene | | None | D | ND | A |
| 16 | None | 16. Oxidized olefin | | None | A | A | D |
| 17 | None | 12. Liquid paraffin | 3. Polyurethane | None | B | A | D |
| 18 | None | 13. Solid paraffin | | None | D | ND | A |
| 19 | None | 14. Polyethylene | | None | D | ND | A |
| 20 | None | 15. Polypropylene | | None | D | ND | A |
| 21 | Primer B | 16. Oxidized olefin | | Finishing agent | A | A | D |
| 22 | None | 16. Oxidized olefin | | Finishing agent 1 | A | A | D |
| 23 | Primer B | 16. Oxidized olefin | | None | A | A | D |
| 24 | None | 16. Oxidized olefin | | None | A | A | D |

INDUSTRIAL APPLICABILITY

A strippable floor coating and a method of forming the coating according to the present invention can save operation time and efforts as compared with the conventional cleaning-by-stripping operation, because the floor-polishing coating layer can be easily stripped in sheets by hand. In addition, the stripping operation can be carried out with safety without causing falling accidents, because the striping operation does not use a stripping agent. The strippable floor coating can be used without anxiety, because it does not adversely affect the working environment and does not cause deterioration of construction materials. In addition, this technique eliminates time and efforts required for treating waste water generated in cleaning-by-stripping of floor polishes and leads to the environmental protection.

The invention claimed is:

1. A strippable floor coating comprising:
a primer layer (D) formed over a floor surface;
an undercoat layer (A) to be applied to the primer layer (D); and
a strippable overcoat layer (B) over the undercoat layer (A),
wherein the undercoat layer (A) is formed from an undercoating agent having film-formability, said undercoating agent comprising: an emulsified dispersion (a1) mainly comprising at least one substance selected from the group consisting of oxidized polyolefins, natural waxes, $C_{10}$-$C_{34}$ fatty acids, $C_{14}$-$C_{34}$ alcohols, and esters between $C_{10}$-$C_{34}$ fatty acids and $C_{14}$-$C_{34}$ alcohols, or a composition (a2) comprising (i) a paraffin and/or a polyethylene each having an acid number of 0 and (ii) a resin emulsion,
wherein the overcoat layer (B) is formed from a floor polish composition mainly containing (1) a urethane resin emulsion comprising silylated urethane resins, (2) a leveling agent, (3) a filming aid, and (4) a crosslinking agent, and silylated urethane resins, and
wherein the undercoat layer (A) has greater adhesion to the primer layer (D) than to the overcoat layer (B) so that the overcoat layer (B) alone is stripped off by hand in the form of a sheet at the interface with the undercoat layer (A).

2. The strippable floor coating according to claim 1, further comprising a finish coat layer (C) over the overcoat layer (B).

3. The strippable floor coating according to claim 1, wherein a primer layer (D) is preliminarily formed over the floor surface, and the undercoat layer (A) is so formed as to have greater adhesion to the primer layer (D) than to the overcoat layer (B) so that the overcoat layer (B) alone is stripped off at the interface with the undercoat layer (A).

4. The strippable floor coating according to claim 1, wherein the resin emulsion (ii) is at least one selected from the group consisting of ethylene-vinyl acetate copolymer emulsions, acrylic emulsions, and urethane emulsions.

5. The strippable floor coating according to claim 1, wherein a finish coat layer (C) and/or a primer layer (D) is formed from an aqueous acrylic floor polish composition.

6. The strippable floor coating according to claim 1, wherein the overcoat layer (B) is an aqueous floor polish composition consisting essentially of (1) 10% to 35% of urethane resin emulsion, (2) 0.1% to 10% of leveling agent, (3) 2% to 15% of filming aid, and (4) crosslinking agent in an amount which provides 0.05 to 0.9 chemical equivalents with respect to the acid number of the urethane resin.

7. The strippable floor coating according to claim 1, wherein
the emulsified dispersion (a1) consists essentially of (1) at least one substance selected from the group consisting of oxidized polyolefins, natural waxes, $C_{10}$-$C_{34}$ fatty acids, $C_{14}$-$C_{30}$ alcohols, and esters between $C_{10}$-$C_{34}$ fatty acids and $C_{14}$-$C_{30}$ alcohols, (2) an emulsifier, and (3) water, or
the composition (a2) consists essentially of (i) a paraffin and/or a polyethylene each having an acid number of 0; and (ii) a resin emulsion.

8. The strippable floor coating according to claim 1, wherein
the emulsified dispersion (a1) consists essentially of (1) at least one substance selected from the group consisting of oxidized polyolefins, natural waxes, $C_{10}$-$C_{34}$ fatty acids, $C_{14}$-$C_{30}$ alcohols, and esters between $C_{10}$-$C_{34}$ fatty acids and $C_{14}$-$C_{30}$ alcohols, (2) an emulsifier, and (3) water, and
the composition (a2) consists essentially of (i) a paraffin and/or a polyethylene each having an acid number of 0; and (ii) a resin emulsion.

9. A method of forming a strippable floor coating comprising a primer layer (D) formed over a floor surface, an undercoat layer (A) to be applied to the primer layer (D), and a strippable overcoat layer (B) over the undercoat layer (A), said method comprising the steps of:
applying an undercoating agent comprising an emulsified dispersion (a1) mainly comprising at least one substance selected from the group consisting of oxidized polyolefins, natural waxes, $C_{10}$-$C_{34}$ fatty acids, $C_{14}$-$C_{34}$ alcohols, and esters between $C_{10}$-$C_{34}$ fatty acids and $C_{14}$-$C_{34}$ alcohols, or a composition (a2) comprising (i) a paraffin and/or a polyethylene each having an acid number of 0 and (ii) a resin emulsion to a floor surface and drying the applied undercoating agent to form an undercoat layer (A), the undercoating agent having film-formability; and
applying a floor polish composition mainly containing (1) a urethane resin emulsion comprising silylated urethane resins, (2) a leveling agent, (3) a filming aid, and (4) a crosslinking agent to the undercoat layer (A) and drying the applied floor polish composition to form a strippable overcoat layer (B), wherein the undercoat layer (A) has a greater adhesion to the floor surface than to the overcoat layer (B) so that the overcoat layer (B) alone is stripped off at the interface with the undercoat layer (A).

10. The method of forming a strippable floor coating, according to claim 9, further comprising the step of forming a finish coat layer (C) over the overcoat layer (B).

11. The method of forming a strippable floor coating, according to claim 9, wherein a primer layer (D) is preliminary formed over the floor surface, and the undercoat layer (A) has greater adhesion to the primer layer (D) than to the overcoat layer (B) so that the overcoat layer (B) alone is stripped off at the interface with the undercoat layer (A).

12. The method of forming a strippable floor coating, according to claim 9, wherein the resin emulsion (ii) comprises at least one selected from the group consisting of ethylene-vinyl acetate copolymer emulsions, acrylic emulsions, and urethane emulsions.

13. The method of forming a strippable floor coating, according to claim 9 or claim 11, wherein a finish coat layer (C) and/or a primer layer (D) is formed from an aqueous acrylic floor polish composition.

14. The method of forming a strippable floor coating, according to claim 10, further comprising the steps of:
   stripping off the finish coat layer (C) over the overcoat layer (B) by hand in the form of a sheet at the interface with the undercoat layer (A), and
   re-applying a floor polish composition mainly comprising an urethane emulsion to the undercoat layer (A) and drying the applied floor polish composition to form a renewal strippable overcoat layer (B).

15. A method for maintenance of a floor coating comprising:
   applying the strippable floor coating according to claim 1;
   stripping the overcoat layer (B) from the floor coating; and
   applying a renewal overcoat layer (B) on the undercoat layer (A).

* * * * *